Sept. 9, 1958  G. H. KRAWINKEL  2,851,618
ELECTROSTATIC DEVICES
Filed May 24, 1955  2 Sheets-Sheet 1
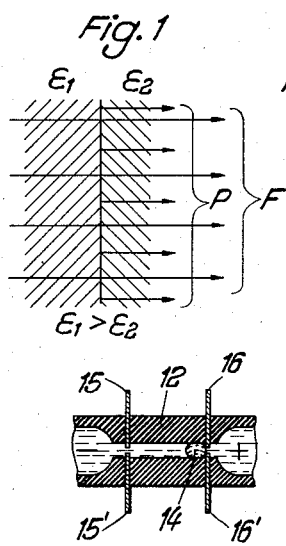
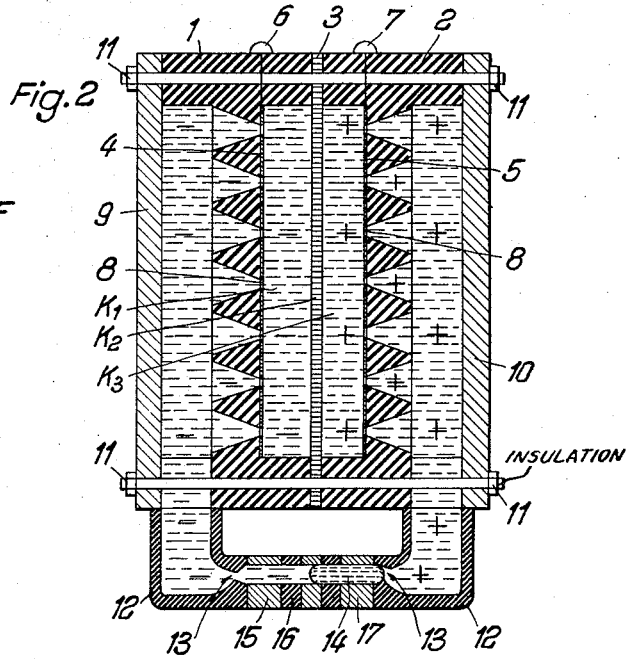
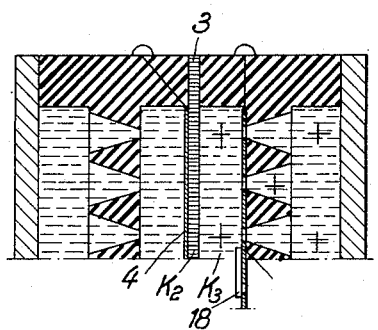
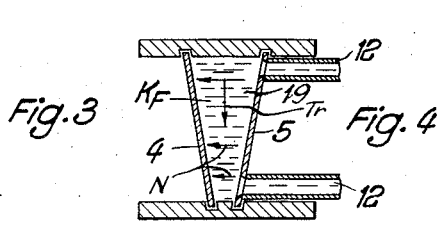

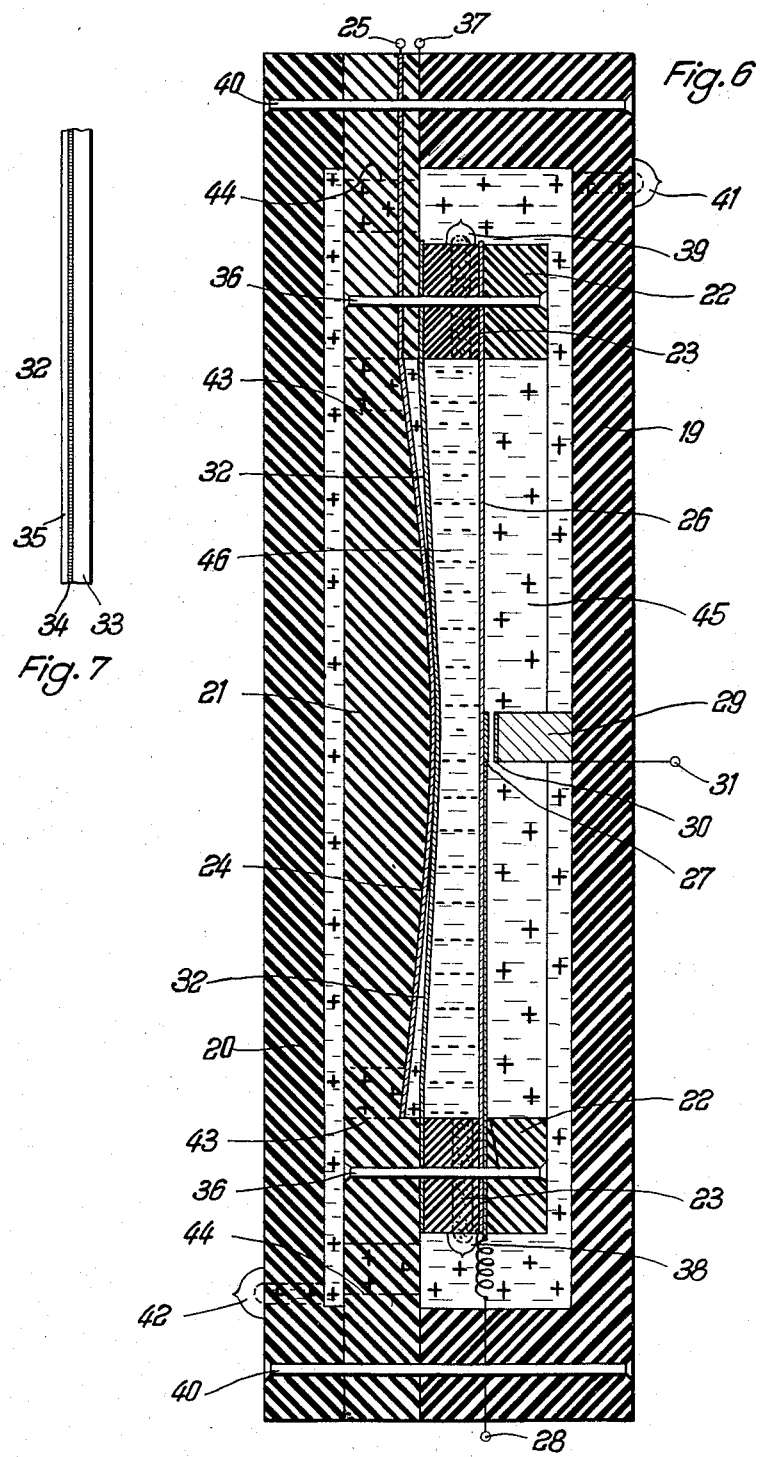

United States Patent Office 2,851,618
Patented Sept. 9, 1958

2,851,618

ELECTROSTATIC DEVICES

Guenther H. Krawinkel, Frankfurt am Main Eschersheim, Germany

Application May 24, 1955, Serial No. 510,657

Claims priority, application Germany June 3, 1954

4 Claims. (Cl. 310—2)

The invention relates to electrostatic devices and more particularly to devices in which forces produced by an electrostatic field within an insulating substance are utilized for producing a power effect.

Electric circuits for switching purposes contain usually either controlled electronic tubes, ionic tubes or electromagnetically operated relays or switches. A certain minimal electrical controlling power is required for operating the relays or similar devices and for building up and maintaining the electromagnetic field of these relays. The present invention deals with a method and means for operating electrical switches and similar elements in which the control is effected by electrostatic fields requiring a substantially lower amount of electrical energy for building up the field. The presence only of the potential energy of an electric voltage is sufficient for maintaining the field.

The basis of the new method is the utilization of an effect producing a force in the electrostatic field in the region of a change of the dielectric constant. This effect is known under the name "gradient $\epsilon$ effect" (normal and transversal), hereinafter called the "grad $\epsilon$ effect."

It is an object of the invention to provide an arrangement in which the electrostatic action of force in the region in which the dielectric constant changes f. i. at the boundary layer of two dielectrics having different dielectric constants, i. e. the normal or transversal grad $\epsilon$ effect is utilized for controlling switches f. i. relays, for indicating purposes or for carrying out other secondary processes.

It is a further object of the present invention to provide an arrangement in which the electric field permeates two or more layers of fluid or solid dielectrics vertically, parallel or under an angle to the normal direction of the boundary layer of the dielectrics, at least two of the adjacent dielectrics having different dielectric constants.

It is a further object of the invention to provide an arrangement in which one of the dielectrics is a polar substance with molecular dipole moment and in which this substance has a dielectric constant depending upon the effective strength of the electrostatic field and in which the force produced within the interior of the dielectric substance by the grad $\epsilon$ effect is used for producing secondary processes.

It is a further object of the invention to provide an arrangement in which a polar substance is used at least as one of the dielectrics having a dielectric constant which is a function of the intensity of the electric field, in which the action of force produced by the grad $\epsilon$ effect varies in response to the applied potential, and in which this force is used for other purposes f. i. for linearizing the force produced at the boundary layers of further dielectric substances or for limiting or converting the resulting effect.

It is a further object of the invention to provide an arrangement in which the actions of forces produced in polar dielectric substances under the influence of locally changing electrical field strengths result in pressure or pulling forces of the dielectric and produce an outer power effect.

Further objects and features of the invention will become apparent from the following specification in connection with the drawings. These drawings show several embodiments of the invention.

Fig. 1 is a diagrammatic representation of the forces existing at the boundary layer of two different dielectrics.

Fig. 2 is a sectional view through a relay according to the invention.

Fig. 3 is a sectional fragmentary view of the upper part of the relay.

Fig. 4 is a sectional view through an arrangement in which the transversal grad $\epsilon$ effect is used.

Fig. 5 is a fragmentary sectional view of another embodiment of a switch for a relay according to Fig. 2.

Fig. 6 is a sectional view of a relay utilizing the transversal grad $\epsilon$ effect.

Fig. 7 is a sectional view of the membrane of the relay of Fig. 6 on an enlarged scale.

Fig. 1 illustrates the principle of the grad $\epsilon$ effect. Two dielectrics with the dielectric constants $\epsilon_1$ and $\epsilon_2$ are located within an electrostatic field F. A force P is produced in their boundary layer; this force is independent of the direction of the electrostatic field and is directed from the dielectric with the higher dielectric constant to the dielectric with the smaller dielectric constant. In the example in Fig. 1 it is assumed that $\epsilon_1$ is larger than $\epsilon_2$ so that the force has the direction of the arrow P independent of the direction of the field F. This grad $\epsilon$ effect which may be either normal as in Fig. 1 or transversal may be utilized to provide electrostatically operated devices having a high breakdown strength, high mechanical stability and a simple structure. These are two important problems which could not be solved by known arrangements using the electrostatic attraction between two electrodes and which excluded hitherto the use of electrostatic devices of this nature at least in the low voltage range.

Fig. 2 shows an embodiment of the invention in which the scale of the individual parts is partly exaggerated for giving a clearer view. A membrane 3 of insulating material is arranged between two members 1 and 2 consisting of insulating material, f. i. plastic material, pressed artificial resin as polystyrole or similar substances. The membrane 3 may f. i. be made of an artificial foil of cellulose hydrate, polyethylene, polyvinylchloride, styroflex, terylene or other foil forming substances eventually with an addition of ground rutile or similar substances, for obtaining a desired dielectric constant of the foil. The insulating members 1 and 2 are provided with recesses on both sides of the membrane and the bottoms of these recesses are covered with metallic layers 4 and 5 which may be produced mechanically or by known methods of metallization as f. i. by chemical deposits, metal evaporation, metal sputtering or by metal spraying. The two layers 4 and 5 are connected to two terminals 6 and 7. The space between the membrane 3 and the member 1 is filled with a liquid or gaseous dielectric, having the dielectric constant $K_1$. The space between the membrane 3 and the member 2 is filled with a liquid or gaseous dielectric with the dielectric constant $K_3$. The insulating substance of the membrane 3 has the dielectric constant $K_2$. In accordance with the invention the value $K_1$ shall be larger than $K_2$ and $K_2$ shall be at least equal preferably, however larger than $K_3$. If now a D. C. or A. C. voltage is applied to the terminals 6 and 7 an electrostatic field is produced between the metal layers 4 and 5 within the various dielectrics and this field without regard to its direction produces a force effect when $K_1 > K_2$ at the left boundary layer of membrane 3; this force acts upon the membrane in Fig. 2 from the left hand side $K_1$ towards the right hand side $K_2$. At the right boundary layer of the membrane 3 a force is produced with $K_2>K_3$ acting upon the membrane in Fig. 2 from $K_2$ at left towards the right hand side $K_3$. This means that, if $K_1>K_2>K_3$ is fulfilled forces of the same direction act upon the membrane at their left and right hand boundary layers so that the insulating membrane is bent towards the right side in the space between the members 1 and 2. As a limit the two adjacent dielectrics may have dielectric constants of equal size and in this case the force would act only at the boundary layer of the substances of different dielectric constants in the direction from larger K to smaller K. For producing an optimal effect upon the membrane the two adjacent dielectrics should have dielectric constants with a ratio of 3 to 1; that means, that in the example of Fig. 2 the optimal force is acting upon membrane 3 if $$K_2 = \frac{K_1}{3}$$

and $$K_3 = \frac{K_2}{3} = \frac{K_1}{9}$$

The membrane 3 bent towards the right side exerts a pressure upon the fluid dielectric $K_3$ within the space between the membrane 3 and the member 2, while a tensional stress is exerted upon the fluid dielectric $K_1$ within the space between the membrane 3 and the member 1. These push and pull forces on the dielectrics are transmitted through small openings 8 in the metal layers 4 and 5; these openings extend into the members 1 and 2 widening into the chambers of the dielectric which as indicated in Fig. 2 are arranged on the rear side of the members 1 and 2 between these members and end closures 9 and 10. The whole arrangement is kept together as indicated in Fig. 2 by insulated screws or bolts or tubular rivets 11. These equalizing chambers are interconnected by a tube 12 of insulating material f. i. thermoplastic artificial resin. This tube has two wide openings on the left and right side of a central portion with smaller width. The transition from the narrow central portion of the tube 12 to the wide outer portions is effected as shown in Fig. 2 by two restricted openings 13. A movable body f. i. a mercury thread 14 or a mercury ball or a metal ball with a diameter equal to the width of the tube is arranged in the narrow central portion of the tube 12. The tube of thermoplastic material is provided in this portion with metal contacts 15, 16, 17 which may be pressed in or metal contacts 15, 15' and 16, 16' are provided as indicated in Fig. 5 in case a mercury ball 14 is employed. The mercury thread or the mercury ball 14 may be located in the illustrated position upon the right hand side of the narrow portion of the tube when the membrane 3 has its position of rest. When now the membrane is bent by the above described action of the forces produced by the grad $\epsilon$ effect in consequence of an A. C. or D. C. voltage applied to the contacts 6 and 7 of Fig. 2 then the pushing and pulling forces are transmitted to the fluid dielectrics on the left hand side $K_1$ and right hand side $K_3$ through the openings 8 having the widening portions for decreasing the frictional resistance. The forces are transmitted finally through the openings 13 to the mercury thread 14 which is moved from right to left in Fig. 2 or Fig. 5 respectively; by this effect. The transformation of a small movement of a large surface (membrane 3) into a larger movement of a smaller surface (surface of the mercury thread 14) produces such a movement of the mercury thread 14 within the narrow central portion of the tube 12 that the mercury thread which connects the contacts 16 and 17 in its position of rest now produces a contact between the terminals 15 and 16 and breaks the contact between terminals 17 and 16. In the arrangement of Fig. 5 the mercury ball connecting the terminals 16 and 16' in its position of rest will now produce a contact between the terminals 15 and 15' and break the contact between the terminals 16 and 16'. According to the invention the restricted portions 13 between the narrow central portion and the wider outer portion of the tube 12 have the purpose to avoid that, when high voltages are applied and the field between the layers 4 and 5 effects that the insulating membrane 3 abuts on the right or left hand side against the surfaces 5 or 4, the mercury thread may escape from the narrow central portion of the tube 12. This is due to the effect of the surface tension of the mercury which cannot enter the widening outer portion of the tube. Fig. 2 shows the principle of an electrostatic relay using the grad $\epsilon$ effect and having an operating and normal contact. This relay is very insensitive to disturbing outer mechanical influences and movements in consequence of the insulating membrane which is held on all sides; the load voltage of the relay is essentially determined by the dielectric strength of the membrane so that a multiple of the operating voltage may be obtained as load voltage of the device.

Fig. 2 shows a tube 12 with operating contacts and contacts of rest between the equalizing chambers of the fluid dielectrics $K_1$, $K_3$. As the movable masses of this relay may have an order of magnitude of milligrams and as on the other hand a multiple of the forces required for moving a short mercury thread or a mercury ball are produced with low electric potentials at the dielectric membrane, it is possible to connect the equalizing chambers of the two dielectrics $K_1$ and $K_3$ by several tube systems 12 with a corresponding multiplicity of contacts for simultaneous operation. Furthermore the central portion of the tube 12 may be provided with a number of contacts arranged adjacent to each other and to effect a successive closure of the relay contacts by raising the control voltage at the terminals 6 and 7 successively step by step. If a larger power shall be switched by the relay contact, as f. i. in rectifiers, D. C.-A. C. inverters or contactors, the mercury thread may be divided into two portions and the tube filled with oil so that the making and breaking of the contacts is always effected within the protecting oil filling. The above mentioned contacting ball may also be surrounded by oil or by a corresponding hydrocarbon, which besides its effect as protecting agent for the contacts has also the effect of a lubricant for the movement of the ball within the narrow tube portion. The viscosity of the lubricant, the adhesion between the lubricant and the walls of the tube, as well as the diameter of the tube are coordinated in such a manner that the effective force of the surface tension of the lubricant at its boundary layer is larger than the weight of the contacting ball consisting f. i. of mercury.

The power required for operating the relay is determined by the capacity between the layers 4 and 5. The power required for maintaining the operated condition is zero, because the potential energy of the electric voltage is transformed in this case into the potential energy of a "position." In consequence of the complete enclosure of all effective parts from the outside the arrangement is not influenced by the humidity of the air or by dust; it requires therefore less service than known devices.

As mentioned above the force produced by the grad $\epsilon$ effect upon the dielectric membrane may be employed for operating the device only at one of the boundary layers so that its effect upon the membrane is correspondingly decreased, in case the change of the dielectric constant is present only at one boundary layer of the membrane. In this case the metal layer 4 of the membrane 3 may be applied f. i. to the membrane itself as represented in Fig. 3 showing the members 1 and 2 and the membrane 3 of Fig. 2 in a sectional view; the lowering of the force acting upon the dielectric membrane in consequence of the unilateral force of the grad $\epsilon$ effect on the right hand surface of the membrane ($K_2 > K_3$) is partly compensated by the decrease of the distance between the layers 4 and 5; the force produced by the grad $\epsilon$ effect on the membrane is assisted in such a case by the known electrostatic attraction of the two electrodes. The load voltage of the arrangement is not reduced as far as it is determined by the dielectric strength of the membrane. As can be seen from Fig. 3 a chamber exists between the surface of member 1 and the rear side of the layer 4 in order to preclude sticking effects in consequence of adhesion. In order to avoid sticking effects on the right hand side of the membrane an abutment 18 of insulating material (see Fig. 3) may be provided with a surface of such a size that the restoring force of the tensioned and bent membrane overcomes the adhesion between the membrane and the abutment. Instead of the dielectric with a dielectric constant $K_1$ any fluid substance may be used for transmitting the pressure or suction forces because the dielectric properties of this substance are not important.

Up to now examples for using the normal grad $\epsilon$ effect have been described.

The transversal grad $\epsilon$ effect may be used f. i. in such a form that an air capacitor is filled with a dielectric of high dielectric constant up to a certain level; a grad $\epsilon$ effect influences the level in response to the applied voltage and this change of level is employed by means of communicating tubes for switching of circuits or for measuring the voltage.

Fig. 4 shows a further example of a device in which the transversal grad $\epsilon$ effect is used. Contrary to the previously described arrangement the layers 4 and 5 are inclined under an angle so that the intensity of the electric field between these layers increases from the top towards the bottom in Fig. 4. The dielectric 19 between the layers may be a polar substance having a molecular dipole moment and a dielectric constant $K_{(F)}$ changing in response to the electric field strength F. In consequence thereof a gradient of the dielectric constant is produced vertically to the direction of the field strength (transversal effect) in the dielectric of Fig. 4. This gradient produces a force acting within the dielectric and effecting a dynamic pressure within the fluid. In consequence of the pressure equalization within the fluid a pushing or pulling effect is produced at the openings of the tubes 12 with the above mentioned consequences.

The dependency of the dielectric constant from the electric field strength in polar substances may be used, f. i. in the arrangement of Fig. 2 when such a substance is employed as the outer dielectric, for linearizing the resulting force at the membrane or for limiting it or even for turning its direction as the ratio of the dielectric constants at one surface of the membrane 3 depends from the value of the field strength. This becomes evident if it is considered that the dielectric constant of such substances becomes f. i. smaller with increasing field strength whereby the force of the normal grad $\epsilon$ effect which is dependent on the ratio of the dielectric constant of the membrane and the outer dielectric in Fig. 2, becomes again dependent on the field strength by way of the fact that the dielectric constant of the outer dielectric (polar substance) depends on the field strength in the opposite sense.

The above described use of the normal grad $\epsilon$ effect may also be employed directly for indicating the static potential; the position of the above mentioned mercury thread within the narrow tube portion of the tube 12 which may be a capillary tube (see Fig. 2) is determined by the applied voltage and may be used as a calibrated measure of the applied voltage. A column of colored liquid may be pushed into the capillary tube by a short mercury thread and the position or level of the column may be used as a calibrated measure for the applied voltage. The fluid dielectric of one side may also be in direct communication with the capillary tube without interposition of a mercury closure and its level may serve as a calibrated measure for the applied voltage. As the grad $\epsilon$ effect obeys a square law the voltage indication may be linearized by a steady change of the cross-section of the capillary tube (increase of the cross-section with increasing level). A voltage indication with shortened scale may be obtained by one or more unsteady changes of the cross-section of the capillary tube.

Fig. 6 shows an electric relay based on the transversal grad $\epsilon$ effect. This relay has the form of a cylinder. The members 19, 20, 21 as well as the rings 22 and 23 consist of a non-elastic artificial resin such as polystyrole. The inner surface of the member 21 has the shape of a calotte of a sphere and is metallized at 24 and this metallization is connected with the terminal 25. An elastic foil 26 of an artificial resin, such as cellulose hydrate, terylene, styroflex or polyethylene is arranged between the rings 22 and 23. A relay contact 27 is fastened to the foil 26 and connected with the terminal 28 by way of a metallization upon the foil. A counter contact 30 is positioned oppositely to contact 27 and mounted on an intermediate member 29. The contacts 27 and 30 are preferably polished in order to avoid point discharges between the relay contacts. The contact 30 is connected with the terminal 31. An essential part of the electrostatic relay is the membrane 32 suspended between the member 21 and the ring 23 and covering the upper part of the calotte of the member 21. This membrane 32 is shown in the sectional view of Fig. 7 on a larger scale. It consists of an elastic foil of artificial resin 33 carrying a metallization 34 applied by evaporation or other suitable processes. This metallization carries a further insulating layer 35 resting with the tensioned foil upon the metallized calotte of the member 21. The thickness of the insulating layer 35 determines essentially the sensitivity of this electrostatic relay. The layer 35 may be produced f. i. by evaporation of silicon oxyde or by the formation of a thin foil of artificial resin. The material of the insulating layer 35 should have a dielectric constant in the present case which is not too high.

The relay of Fig. 6 is mounted by fastening the two membranes 32 and 26 under tension by means of the rings 22 and 23 to the base member 21 by hollow rivets 36. The metallization 34 of the membrane 32 is connected to the terminal 37. A liquid f. i. nitrobenzene is filled into the space between the membranes 32 and 26 through the openings 38 and 39. The openings 38 and 39 are closed after this space has been filled. The outer members 19 and 20 are then applied and fastened to the inner member by hollow rivets 40; a polar substance with molecular dipole moment, such as dried nitrobenzene is filled into all cavities through the openings 41 and 42. The base member 21 has passages 43 and 44 for this purpose. The remaining space between the membrane 32 and the metallized calotte of the member 21 is completely filled with nitrobenzene through the passage 43. After the spaces have been filled the openings 41 and 42 are closed.

For operating the electrostatic relay the operating voltage is applied to the terminals 37 and 25, whereby an electric field of outwardly decreasing strength is produced between the metal electrodes 34 and 24. In consequence of the local changes of the electric field strength a force is produced within the dielectric 45 consisting of a polar material having a molecular dipole moment; this force results in building up a pressure within the fluid dielectric f. i. from the outside towards the interior when the dimensions are suitably chosen and the temperature is normal. The membrane 32 is lifted and the membrane 26 is raised by means of the fluid filling 46 serving as transmitting agent between the membranes 32 and 26 so that a contact is effected between the contacts 27 and 30.

The influences of the outer temperature may be compensated in all these devices by suitably choosing the coefficient of thermal expansion of the filling fluid and of the material of the container eventually by employing equalizing containers. The changing level of the fluid or the pressure of a gas may be used for operating an indicator.

A variable capacitor may be produced by means of the described electrostatic devices by introducing a fluid dielectric more or less deeply into a suitably formed air capacitor.

When the device of the invention is used for operating a switch, a relay, a rectifier, an A. C.-D. C. converter, or a voltage indicator, a substantial advance in the art is produced by the high load voltage, the mechanical stability of the device, the low power consumption required for the control, as well as by the negligible service during operation. The device may be used for low voltage purposes, for high tension devices, for controlling purposes, and storage purposes.

What I claim is:

1. An electrostatic device comprising means for producing a non uniform electrostatic field, a number of electrodes connected to different voltages, said electrodes having non uniform distances, a dielectric material within said field, said material consisting of a fluid polar substance having a molecular dipole moment, means transforming the action of the grad $\epsilon$ effect existing within said dielectric into pressure or suction forces and output means adapted to be actuated by these forces.

2. The electrostatic device of claim 1 in which one of said electrodes has the form of a substantially flat conducting membrane provided with an insulating layer on one side thereof, a second electrode in the form of a conducting calotte of a sphere, said first electrode being stretched over the calotte and the space between said electrodes being filled with said dielectric polar substance.

3. The electrostatic device of claim 2 including a second membrane and contacts on said second membrane, and in which the movement of said first membrane is transmitted by an operating fluid unto the second membrane.

4. An electrostatic device for operating relays, switches or similar devices comprising a dielectric membrane, a fluid dielectric at least at one side of said membrane, said fluid dielectric having another dielectric constant than the membrane, means producing an electric field permeating the boundary layer between said membrane and said fluid dielectric, means transforming the action of the grad $\epsilon$ effect originating in the boundary layer into forces, means in said device adapted to be operated by said forces, the dielectric membrane consisting of a thermoplastic foil with an addition of ground rutile.

References Cited in the file of this patent

UNITED STATES PATENTS

| | | |
|---|---|---|
| 993,062 | Heath | May 23, 1911 |
| 1,446,748 | Johnsen et al. | Feb. 27, 1923 |
| 2,195,792 | Straatveit | Apr. 2, 1940 |
| 2,332,947 | Strommer | Oct. 26, 1943 |
| 2,393,201 | Stafford | Jan. 15, 1946 |
| 2,744,980 | Bellamy | May 8, 1956 |
| 2,786,111 | Reed | Mar. 19, 1957 |